(12) United States Patent
Shen

(10) Patent No.: US 10,609,383 B2
(45) Date of Patent: Mar. 31, 2020

(54) VIDEO COMPRESSION USING DOWN-SAMPLING PATTERNS IN TWO PHASES

(71) Applicant: HULU, LLC, Santa Monica, CA (US)

(72) Inventor: Yuxiang Shen, Beijing (CN)

(73) Assignee: HULU, LLC, Santa Monica, CA (US)

(*) Notice: Subject to any disclaimer, the term of this patent is extended or adjusted under 35 U.S.C. 154(b) by 363 days.

(21) Appl. No.: 15/482,653

(22) Filed: Apr. 7, 2017

(65) Prior Publication Data

US 2018/0295368 A1 Oct. 11, 2018

(51) Int. Cl.
*H04N 7/12* (2006.01)
*H04N 19/154* (2014.01)
*H04N 19/176* (2014.01)
*H04N 19/132* (2014.01)

(52) U.S. Cl.
CPC ......... *H04N 19/154* (2014.11); *H04N 19/132* (2014.11); *H04N 19/176* (2014.11)

(58) Field of Classification Search
CPC .. H04N 19/132; H04N 19/154; H04N 19/176; H04N 19/00; H04N 19/61; H04N 19/60; H03M 7/3055; G06K 9/4642
USPC ........................................ 375/240.01–240.29
See application file for complete search history.

(56) References Cited

U.S. PATENT DOCUMENTS

| | | |
|---|---|---|
| 4,791,486 A | 12/1988 | Spriggs et al. |
| 5,825,426 A | 10/1998 | Wickstrom et al. |
| 2007/0140569 A1 | 6/2007 | Tabuchi et al. |
| 2009/0080770 A1 | 3/2009 | Jiang et al. |
| 2009/0097564 A1* | 4/2009 | Chen ............... H04N 19/61 375/240.17 |
| 2013/0129326 A1* | 5/2013 | Wang ............... H04N 19/00 386/355 |
| 2014/0334736 A1* | 11/2014 | Niu ............... G06K 9/4642 382/195 |

(Continued)

FOREIGN PATENT DOCUMENTS

WO 2010029481 A1 3/2010

OTHER PUBLICATIONS

International Search Report and Written Opinion for International Appln. No. PCT/US2018/026334 dated Jul. 27, 2018, 15 pages.

(Continued)

*Primary Examiner* — Gims S Philippe
(74) *Attorney, Agent, or Firm* — Fountainhead Law Group P.C.

(57) ABSTRACT

A method receives an image from a video. The image is split into a first set of first blocks of a first size and then the first blocks are split into a second set of second blocks of a second size. The method tests a first set of down-sampling patterns for the second set of second blocks in a first block in the set of first blocks to determine if a quality of reconstruction of the down-sampled second blocks meets a threshold associated with the respective first set of down sampling patterns. Second blocks satisfying the threshold are down-sampled using the first set of down-sampling patterns. Also, the method tests a second set of down-sampling patterns for the first block using a second set of down-sampling patterns to select one of the second set of down sampling patterns to use to down-sample second blocks that did not satisfy the threshold.

20 Claims, 15 Drawing Sheets

(56) References Cited

U.S. PATENT DOCUMENTS

2016/0156367 A1* 6/2016 Kalevo .............. H03M 7/3055
375/240
2017/0070752 A1* 3/2017 Kalevo .............. H04N 19/60

OTHER PUBLICATIONS

Wallace, Gregory K. "The JPEG still picture compression standard." IEEE transactions on consumer electronics 38.1 (1992): xviii-xxxiv.
Skodras, Athanassios, Charilaos Christopoulos, and Touradj Ebrahimi. "The JPEG 2000 still image compression standard." IEEE Signal processing magazine 18.5 (2001): 36-58.
X. Wu and N. Memon, "Context-based, adaptive, lossless image coding", IEEE Transactions on Comm.,vol. 45, No. 4 (1997): 437-444.
Y. Y. Lee, YH. Lee and T. Tsai, "An efficient lossless embedded compression engine using compacted—FELICS algorithm", In SOC, pp. 233-236, IEEE 2008.
Y. X. Lee and T. Tsai, "An efficient embedded compression algorithm using adjusted binary code method", In ISCAS, IEEE 2008.
Y. H. Lee, YY Lee, HZ. Lin and T. Tsai, "A high-speed lossless embedded compression codec for high-end LCD applications", In A-SSCC'08, pp. 185-188, IEEE, 2008.
C. Wei, L. Ding, P. Tsung, and L. Chen, "Architecture design of high performance embedded compression for high definition video coding", In ICME, pp. 825-828. IEEE, 2008.
K. Jaemoon, K. Jungsoo, and C. Kyung, "A lossless embedded compression algorithm for high definition video coding", In ICME, IEEE, 2009.
L. Y. Hsuan, Y. Chen, and T. Tsai, "A bandwidth-efficient embedded compression algorithm using two-level rate control scheme for video coding system", In ISCAS, IEEE, 2010.
I. Yuri., D. and Moloney, "Reference frame compression using embedded reconstruction patterns for H. 264/AVC decoder", In ICDT, pp. 168-173. IEEE, 2008.
L. Young, "A new frame-recompression algorithm and its hardware design for MPEG-2 video decoders", IEEE Trans. on Circuits and Syst. for Video Technology, vol. 13, No. 6 (2003): 529-534.
R. Bruni, A. Chimienti, M. Lucenteforte, D. Pau, and R. Sannino, "A novel adaptive vector quantization method for memory reduction in MPEG-2 HDTV decoders", IEEE Trans. on Consumer Electronics, vol. 44, No. 3 (1998): 537-544.
C. Chi, P. Tseng, and L. Chen, "Multimode embedded compression codec engine for power-aware video coding system", IEEE Trans. on Circuits & Syst. For Video Tech., vol. 19, No. 2, 2009, 141-150.
M. Celik, G. Sharma and A. Tekalp, "Gray-level-embedded lossless image compression", Signal Processing: Image Communication vol. 18, No. 6 (2003): 443-454.
K. Jaemoon, and C. Kyung, "A lossless embedded compression using significant bit truncation for HD video coding", IEEE Trans. on Circuit & Syst. for Video Tech., vol. 20, No. 6, 2010, 848-860.
Shen, Yuxiang, and Xiaolin Wu. "Down-sampling based embedded compression in video systems." 2015 IEEE International Symposium on Circuits and Systems (ISCAS). IEEE, 2015.
Yang, Guangzheng, and Thomas S. Huang. "Human face detection in a complex background." Pattern recognition 27.1 (1994): 53-63.
Viola, Paul, and Michael J. Jones. "Robust real-time face detection." International journal of computer vision 57.2 (2004): 137-154.

* cited by examiner

VIDEO COMPRESSION USING DOWN-SAMPLING PATTERNS IN TWO PHASES

BACKGROUND

Image resolution in video processing and display systems keeps increasing. With the video quality evolving from standard definition to high definition, and further toward super high definition, the bandwidth and power consumption used in video processing results in a bottleneck. For example, the increased resolution consumes more bandwidth of the network and also challenges the communication throughput of internal computer memory.

Many video processing algorithms exploit inter-frame correlations, which means the encoder uses information from other frames to compress a current frame. This requires that frames of the video be stored in memory such that the frames can be referenced during video compression. This may require high-speed dynamic random access memory (DRAM) external to the processing unit to store the required reference frames. As frame resolution increases, the DRAM bandwidth as well as power consumption results in more serious bottlenecks. More DRAM bandwidth is used to transfer the larger frames from memory to the video processing unit. Further, processing the larger frames also uses more power.

DETAILED DESCRIPTION

Described herein are techniques for a video compression system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide content adaptive video compression. The video compression process may first split an image into blocks of a first size, such as multiple blocks of a 6×6 size. Then, the process may further split each block into sub-blocks of a second size, such as sub-blocks of a 3×3 size in a first phase. For example, a 6×6 block includes four 3×3 sub-blocks. The process then encodes pixels in the sub-blocks using a first set of sub-block down-sampling patterns and determines whether one of the patterns should be selected for down-sampling each sub-block. For example, the process calculates a quality metric that measures the quality of the reconstruction of the 3×3 sub-block when using the patterns and compares the quality metric to a threshold to determine if the compression results in a quality that meets the threshold. If the quality meets the threshold, then the process marks the sub-block with one of the first set of sub-block down-sampling patterns. This process may be performed for every sub-block in the block, and also for every block in the image.

After testing the first set of sub-block down-sampling patterns, the process zooms out to the first size of blocks, such as the 6×6 blocks, to perform a second phase. Then, a second set of block down-sampling patterns are used to encode the block. The second set of block down-sampling patterns apply less compression to the blocks than the first set of sub-block down-sampling patterns. The second set of block down-sampling patterns are applied to the entire 6×6 block. However, the sub-blocks that were encoded using the first set of patterns are not affected by this down-sampling. Only sub-blocks that were not down-sampled using the first set of sub-block down-sampling patterns have pixels selected for down-sampling during the second phase. The pixels selected using either the first set of sub-block down-sampling patterns or the second set of block down-sampling patterns are encoded and are then sent to a decoder. Accordingly, if the quality that results from using the first set of sub-block down-sampling patterns is inadequate, then the second set of block down-sampling patterns may be used to down-sample portions of the image. The use of the first phase allows some blocks to be down-sampled even further based on using the first set of sub-block down-sampling patterns, but only if the quality is adequate.

System

Figure 1:
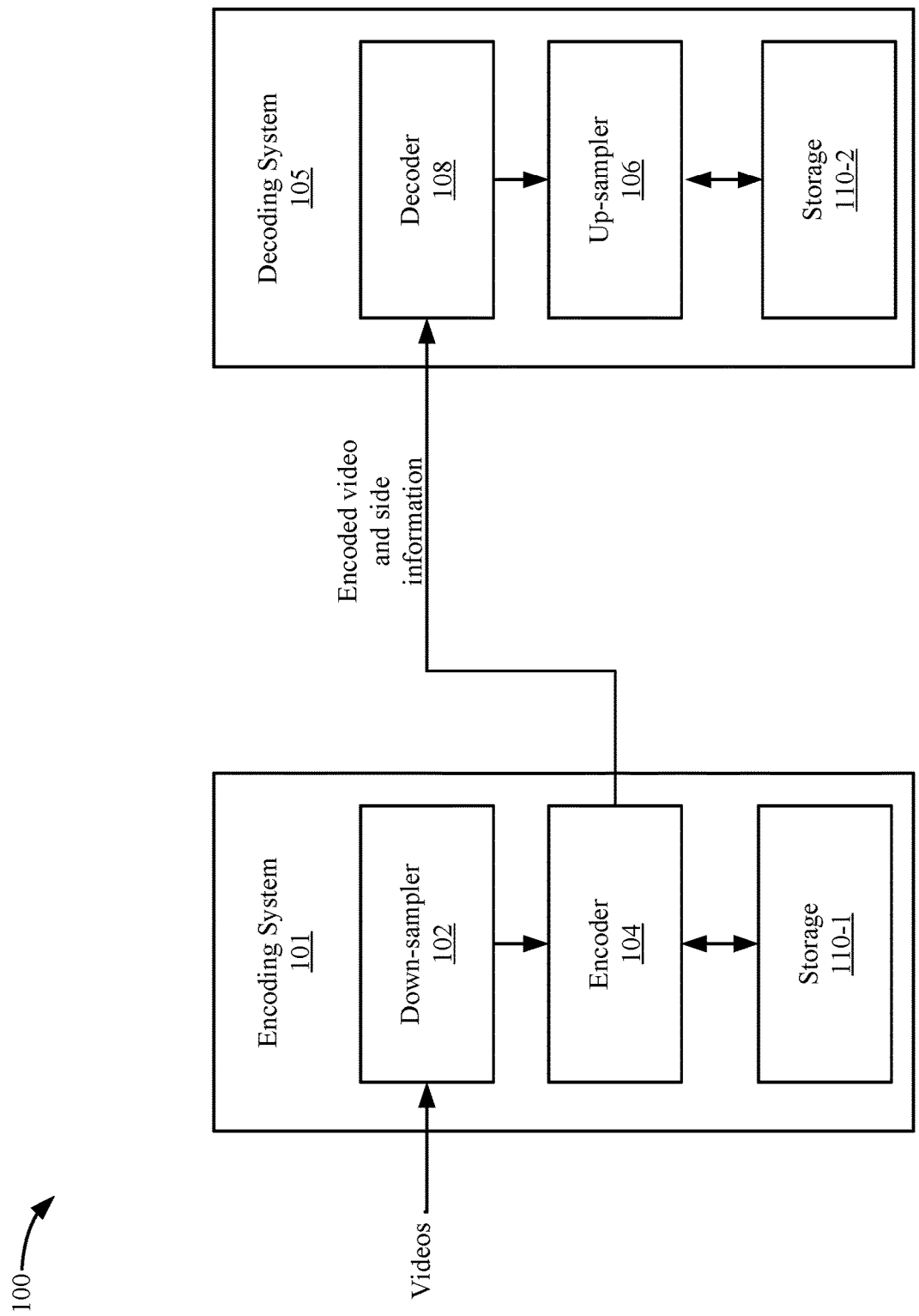
FIG. 1 depicts a simplified system for compressing video according to one embodiment.

FIG. 1 depicts a simplified system 100 for compressing video according to one embodiment. System 100 includes an encoding system 101 that includes a down-sampler 102 and an encoder 104, and a decoding system 105 that includes an up-sampler 106, and a decoder 108. In one embodiment, down-sampler 102 and encoder 104 may be in a server and up-sampler 106 and decoder 108 may be in a client. In this case, encoding system 101 may send encoded video across a network, such as a wide area network, to decoding system 105. In another embodiment, the entities in system 100 may be included in a single computing device. In this case, a computer processor, such as a central processing unit (CPU) or graphics processing unit (GPU), may process the video to be encoded and send the encoded video to another component of the computing device. This type of compression may be referred to as embedded compression (EC) because the compression is happening within the computing device and compressed between internal components.

In one embodiment, the video may be offered by a video delivery service to users that can request the video on-demand or view the video live. In other embodiments, the video may be compressed for other reasons, such as for routing the video on a single computing device. Down-sampler 102 may receive video that includes a series of images. Then, down-sampler 102 uses a content adaptive down-sampling process to adaptively down-sample images based on the content being encoded. The down-sampling may reduce the resolution of the images. For example, the number of pixels in the image may be reduced before being encoded. This may reduce the image quality, but the amount of information that is encoded and subsequently transferred to decoder 108 is reduced.

In one embodiment, the down-sampling is adaptive based on the content of the image. As will be discussed below, a two phase down-sampling process uses different down-sampling patterns and different levels of compression based on the content of the images. For example, as discussed above, a block may be broken into sub-blocks and sub-block down-sampling patterns for the sub-blocks are tested.

During the selection of the down-sampling patterns, encoder 104 encodes the pixels that have been selected for each pattern. The encoded pixels for the selected patterns for the image are output in an output bitstream that includes less bits compared to if the full image was encoded. The reduction in size is achieved because the number of pixels that need to be encoded has been reduced by down-sampler 102. In one embodiment, encoder 104 references down-sampled images stored in storage 110-1 to perform the encoding. For example, inter-prediction may use down-sampled images stored in storage 110-1 to perform the encoding. Particular embodiments reduce the size of images that are encoded and also reduce the bandwidth that is used to retrieve down-sampled images from storage 110-1 for use in the encoding process.

Encoder 104 sends the encoded video to up-sampler 106 in decoding system 105. Additionally, encoder 104 sends side information regarding the down-sampling that was performed. For example, encoder 104 sends side information to identify whether the sub-block down-sampling was enabled and also identify the down-sampling pattern that was used.

Decoder 108 receives the encoded video and can then decode the encoded images. Up-sampler 106 can then up-sample the images using the side information. Up-sampler 106 up-samples the images using the side information by identifying the down-sampling pattern used to recover the pixels removed from the images using an interpolation method to interpolate the removed pixels from the existing pixels. In one example, decoder 108 references the up-sampled decoded images that have been previously decoded and stored in storage 110-2 when decoding other images.

Down-Sampling Patterns

Figure 2:
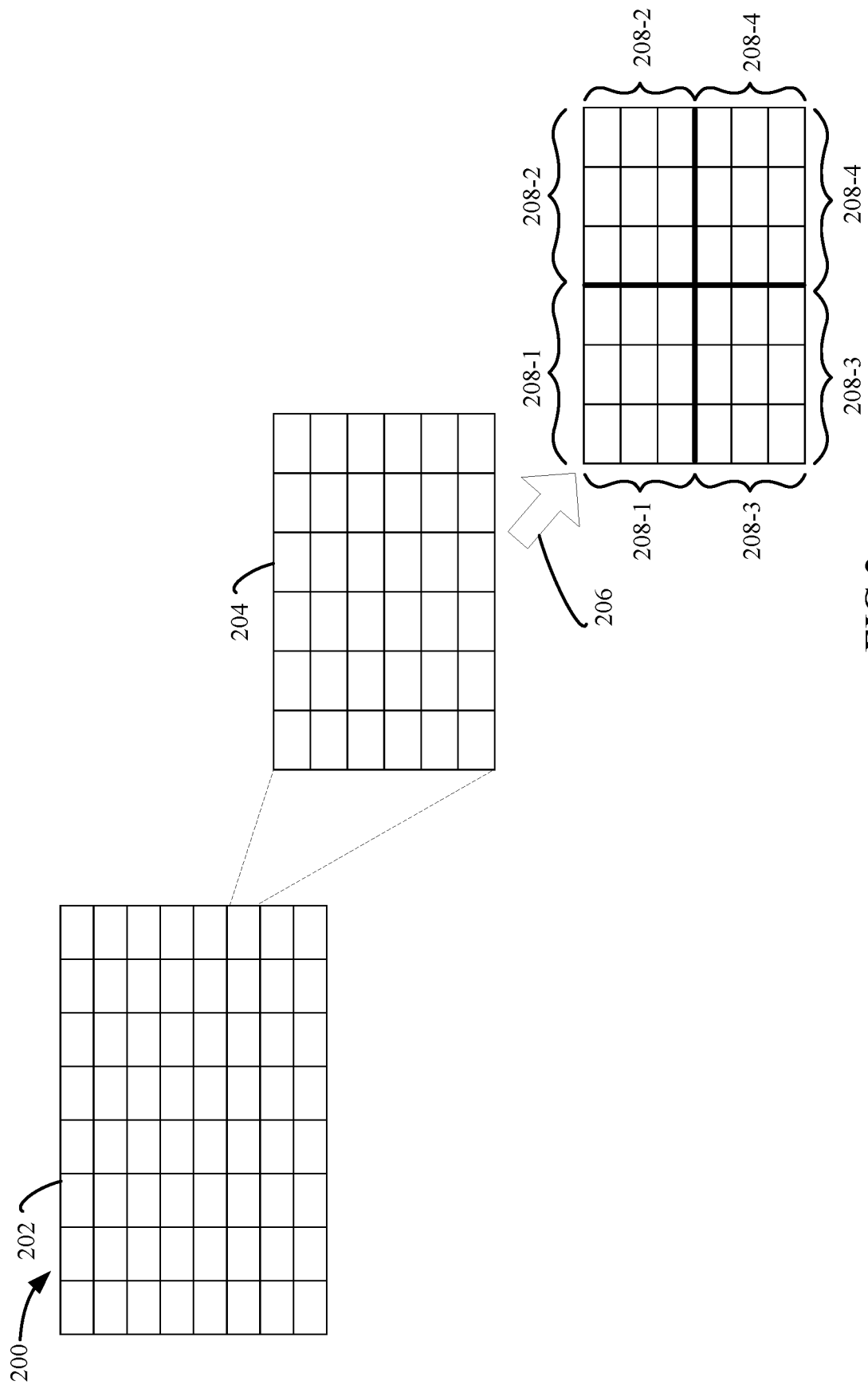
FIG. 2 shows an example of an image according to one embodiment.

The following describes the down-sampling process in more detail. FIG. 2 shows an example of an image 200 according to one embodiment. Image 200 may be a single image in a video, such as a frame. Although the processing of a single image is discussed, it will be understood that video includes multiple images and the same processing can be performed for all the images. Image 200 includes a number of blocks. In this case, image 200 may include X number of blocks in the horizontal direction and X number of blocks in the vertical direction. Each block may be encoded separately by encoder 104.

Down-sampler 102 partitions image 200 into (N, N) or N×N blocks at 202. When "N×N" is used, this is the block size of a block, such that a block may be partitioned into six pixel units (e.g., a 1×1 pixel) horizontally and six pixel units vertically. A pixel unit may be represented by a number of bits. In one embodiment, image 200 is partitioned into 6×6 blocks, which means that each block is the size of 6×6 pixel units. This does not mean that image 200 includes 6*6=36 blocks.

A 6×6 block in image 200 is shown at 204. Although 6×6 blocks are used, it will be understood that other sizes may be used, such as 132×132 pixels. The 6×6 size blocks are a first level of partitioning. Then, down-sampler 102 splits each block into sub-blocks the size of P×P. This further splits the pixels of the 6×6 block into smaller blocks, such as the size of 3×3 pixels. For example, at 206, a single 6×6 block is split into four 3×3 sub-blocks 208-1-208-4.

In one embodiment, smooth areas occupy a large portion of an image. For natural images, most blocks are smooth and have rather small dynamic ranges. Therefore, sampling patterns with lower sampling rates could be applied to blocks that are mostly smooth. The sampling rate compares the number of pixels selected for encoding with the number of pixels dropped and not encoded. Dropping of a pixel means that information for that pixel is not encoded and included in the output bitstream. Only the selected pixels are encoded and included in the output bitstream. This allows higher compression ratios to be achieved without much loss of decompression quality. Accordingly, particular embodiments provide down-sampling patterns for sub-blocks that can provide higher compression. However, there are certain times when these higher compression down-sampling patterns may not produce adequate quality compared to the regular 6×6 block down-sampling patterns. Accordingly, particular embodiments use a threshold to determine whether or not to use the sub-block down-sampling patterns. The 6×6 block down-sampling patterns may not be compared to a threshold since these patterns are the lowest compression possible that are available in the process. Rather, one of the 6×6 block down-sampling patterns are selected if pixels still need to be encoded in the image after the first phase.

Figure 3A:
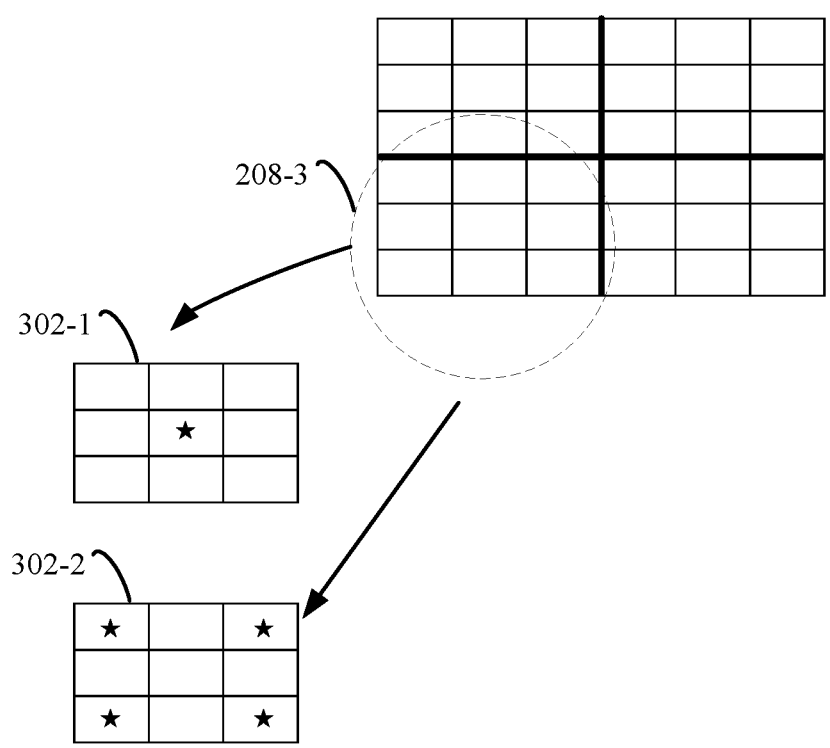
FIG. 3A shows an example of down-sampling patterns for the sub-blocks according to one embodiment.

In the first phase, each sub-block can be tested using a first set of sub-block down-sampling patterns for the sub-blocks. FIG. 3A shows an example of sub-block down-sampling patterns 302-1 and 302-2 for the sub-blocks according to one embodiment. In one embodiment, down-sampling patterns in a 9:1 and 9:4 ratio are used although other down-sampling ratios may be used, such as 9:3 or 9:2. The asterisk shown in a pixel unit indicates that a pixel is used to represent the pixel unit. If the pixel unit is empty, then that pixel is dropped. If fewer pixels are used to represent the 3×3 block, then the 3×3 block is down-sized more and uses less size. However, the quality (e.g., resolution) is lower and thus the balance between the quality and compression achieved is weighed by down-sampler 102. These down-sampling patterns were selected because they represent a balanced pattern under a specific sampling ratio, and are statistically more likely to keep critical texture information for later decompression. Another 9:4 pattern may select the second pixel in the 1st row, the first and third pixels in the second row, and the second pixel in the third row. Although these patterns are discussed, other patterns may be used by selecting pixels in other blocks. Also, although two patterns are discussed, only one pattern may be used, or more than two patterns.

At 302-1, the 9:1 down-sampling pattern selects one pixel in the center of the 3×3 sub-block. This provides a 9:1 compression ratio. At 302-2, the 9:4 down-sampling pattern selects four pixels at the corners of the 3×3 sub-block. This provides a 9:4 compression ratio. The 9:1 and 9:4 down-sampling pattern may work will with natural images, and graphical images such as on a computer screen (e.g., a remote desktop system). These images tend to have smooth textures in most areas where the dropped pixels can be interpolated without much error. Thus, the pixels not included in the bitstream can be more accurately recovered using the pixels that were included in the bitstream due to the similarity of the dropped pixels to the pixels that were encoded.

In one embodiment, down-sampler 102 first tests a first sub-block down-sampling pattern against a first threshold T1 in a sub-block. For example, down-sampler 102 may test the 9:1 down-sampling pattern at 302-1. To perform the test, down-sampler 102 selects the pixel in the center of a sub-block and encoder 104 encodes the pixel for the sub-block. The other pixels are dropped and not encoded. Then, encoding system 101 can recover the sub-block using a decoding process. For example, interpolation is used, such as bi-cubic interpolation, bi-linear interpolation, or other interpolation methods, to interpolate the value of the dropped pixels from the one pixel that was encoded.

Down-sampler 102 has the original image and can thus compare the recovered sub-block to the original sub-block to generate a quality measurement of the reconstruction (e.g., the compression and recovery). The quality may be represented by the metric, such as the peak signal to noise ratio, but other metrics may be used, such as signal to noise ratio or mean square error.

Down-sampler 102 then tests the quality measurement against a threshold T1. If down-sampler 102 determines that the quality measurement for using the 9:1 down-sampling pattern is above the threshold T1, then this pattern is used because it offers the most compression. Down-sampler 102 can mark the sub-block as using the sub-block down-sampling and also which pattern is used. If not, then the process proceeds to test other patterns.

If the quality measurement for the 9:1 down-sampling pattern does not meet threshold T1, then down-sampler 102 tests another pattern if available, such as the 9:4 pattern shown at 302-2. The second sub-block pattern uses four pixels to represent the sub-block that are encoded by encoder 104. In one embodiment, these pixels are located in the outside corners of the block although other pixels could be selected, such as pixels on one side. The other pixel units that do not include asterisks and are dropped and not encoded. To perform the test, down-sampler 102 selects the four pixels in the sub-block and encoder 104 encodes the four pixels. Then, encoding system 101 can recover the sub-block using a decoding process as described above and generate a quality measurement of the reconstruction by comparing the recovered sub-block to the original sub-block.

Since this compression ratio is 9:4, it is possible that the quality is higher than the 9:1 compression ratio. Down-sampler 102 then tests the quality measurement of the second pattern against a threshold T2. The threshold T2 may be the same threshold as T1 or may be a different threshold.

If down-sampler 102 determines that the quality measurement for using the 9:4 down-sampling pattern is above the threshold T2, then this pattern is used. Down-sampler 102 can mark the sub-block as using the sub-block down-sampling and also which pattern is used if the pattern is selected. However, if neither sub-block down-sampling pattern meets the quality threshold, then the sub-block is not represented using the two sub-block down-sampling patterns.

Figure 3B:
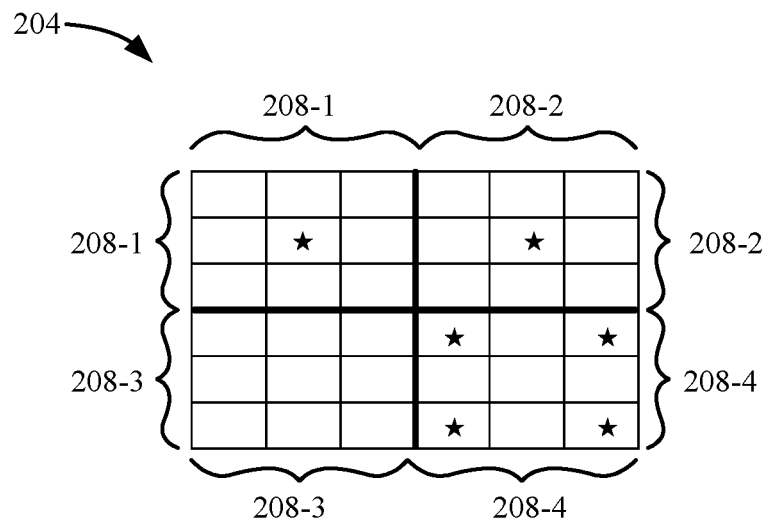
FIG. 3B shows an example of a zoomed-out block with asterisks where the 3×3 patterns have been used according to one embodiment.

Once the process is performed for each sub-block 208-1-208-4 in block 204, then down-sampler 102 zooms out to the 6×6 block and then performs a second phase with other down-sampling patterns that are lower-rate patterns from the down-sampling patterns used for the 3×3 sub-blocks. FIG. 3B shows an example of a zoomed-out block at 204 with asterisks where the 3×3 patterns have been used according to one embodiment. For example, some, but not all, sub-blocks were encoded using the sub-block down-sampling patterns. For example, sub-blocks 208-1 and 208-2 use the 9:1 down-sampling pattern and sub-block 208-4 uses the 9:4 down-sampling pattern. The asterisks in the blocks show where pixels are used for encoding the respective sub-blocks and blank blocks are pixels that are dropped.

Sub-block 208-3 did not have a sub-block down-sampling pattern applied to it, however. It is noted that depending on the first phase, different sub-blocks may have sub-block down-sampling patterns applied, which also includes all sub-blocks or no sub-blocks. If all sub-blocks use sub-block down-sampling patterns, then no further analysis is needed at the block level in the second phase. However, if there is a sub-block that did not have a sub-block down-sampling pattern applied, then down-sampler 102 performs the following process in the second phase.

Figure 3C:
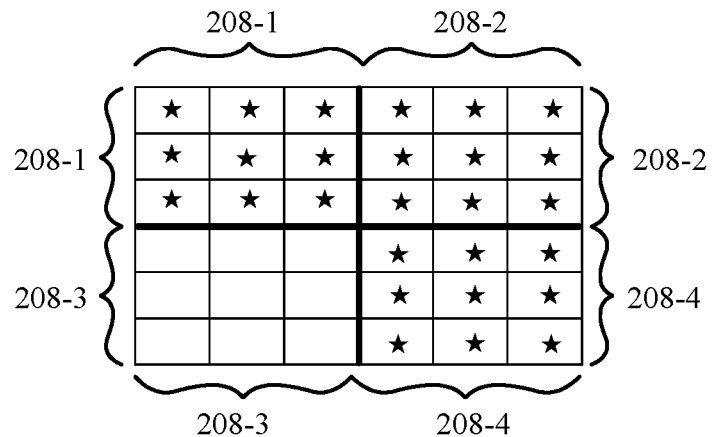
FIG. 3C shows an example of the 6×6 block in preparation for applying the block down-sampling patterns according to one embodiment.

First, down-sampler 102 selects a block down-sampling pattern for the 6×6 block for a second set of block down-sampling patterns. The block down-sampling pattern is applied to the whole block, but sub-blocks and respective pixels that were selected in the first process are not affected. FIG. 3C shows an example of the 6×6 block in preparation for applying the block down-sampling patterns according to one embodiment. In one embodiment, the pixels already encoded in the sub-block encoding phase are not affected by the block encoding phase. However, the recovered pixels should be used in evaluating the block down-sampling patterns since these pixels will be used in the subsequent decoding at decoder 108. Asterisks have been added to blocks in sub-blocks 208-1, 208-2, and 208-3 to represent the decoded pixels that are recovered from the encoding process performed using the sub-block down-sampling patterns. As discussed above, the pixels that were removed may be interpolated. In another embodiment, the original pixels in the image may be used instead of the recovered pixels.

Figure 4A:
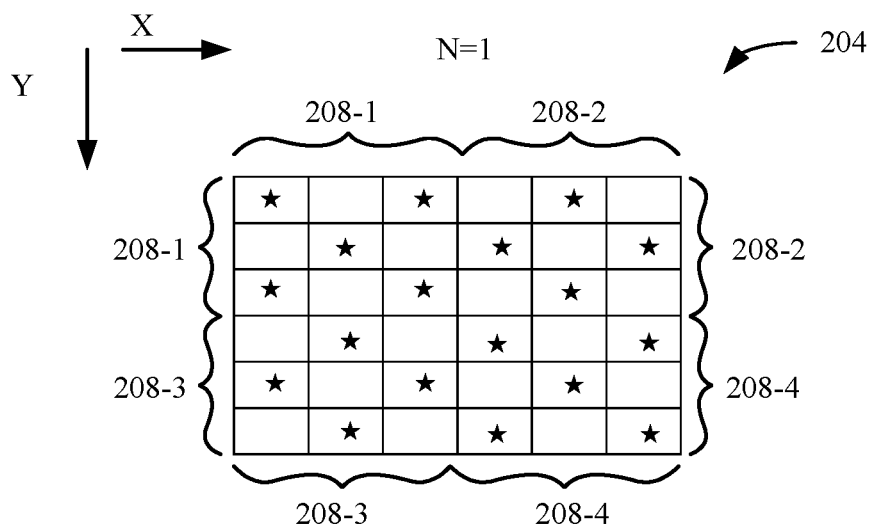
FIGS. 4A-4C depict the block down-sampling patterns that may use different spatial sample configurations at the 6×6 block level according to one embodiment.
Figure 4B:
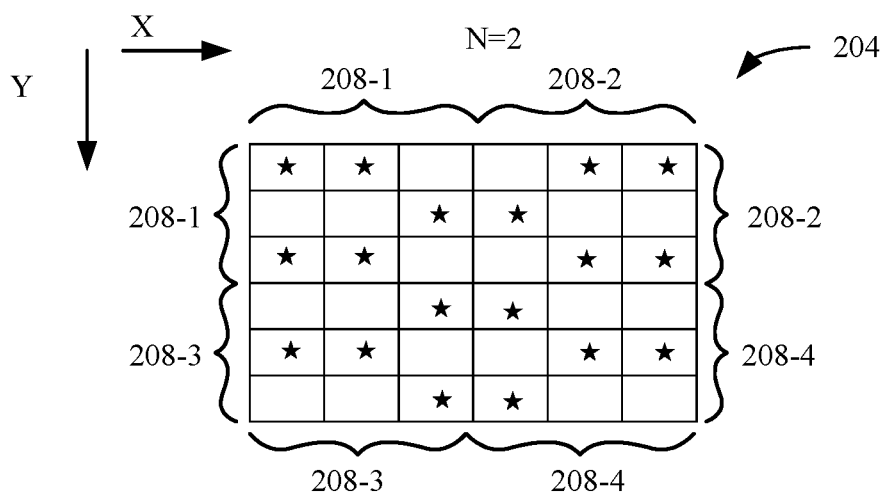
Figure 4C:
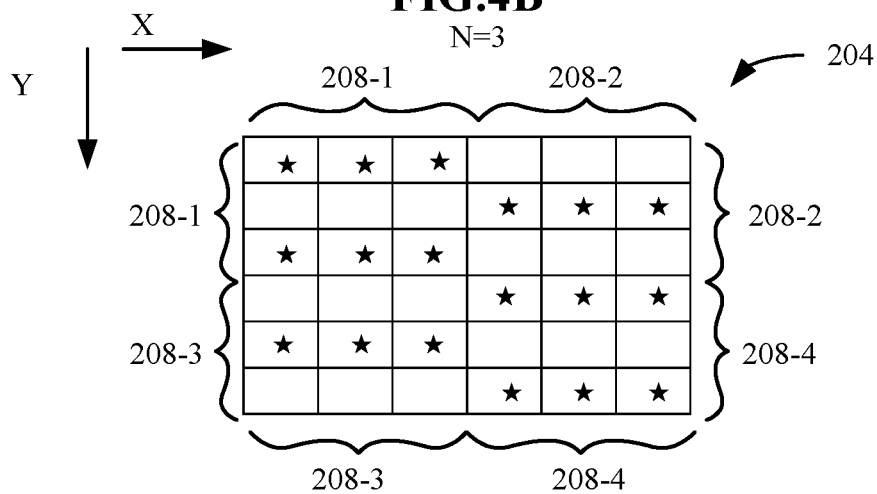

The block down-sampling patterns may use different spatial sample configurations of a parameter as illustrated in FIGS. 4A-4C, where N is half the sampling period in pixel units (e.g., 2:1). In other words, every N pixels are sampled and dropped in the horizontal direction. These patterns can also be rotated by 90°. In the patterns, an asterisk indicates that the pixel is sampled and a blank indicates that the pixel is dropped in the down-sampling. FIGS. 4A-4C indicate the down-sampling patterns for N=1, 2, and 3, but other down-sampling patterns may be used, such as N=4 and N=5. The different sampling patterns may be better suited for different image features. For example, the N=2 down-sampling pattern may be able to reconstruct sharp image features much better than the N=1 down-sampling pattern. In general, for a larger N, more pulses occur in the spectrum while the magnitude of each new impulse will be decreasing. An N=4 pattern may be a better choice if vertical edges are present in the image blocks. Also, an N=4 pattern may also be good if horizontal edges are present and the N=4 pattern is rotated 90°.

In FIG. 4A, the block down-sampling pattern is N=1 and thus every other pixel is dropped. Block 204 is partitioned into 6×6 pixels. Every other pixel is dropped in this case. As can be seen, block 204 is represented by 18 pixels in the N=1 down-sampling pattern. This down-sampling pattern requires more pixels than the 9:1 down-sampling pattern, which required 1 pixel to represent the sub-block, and the 9:4 down-sampling pattern, which required 4 pixels to represent sub-block. If only looking at a sub-block for the N=1 block down-sampling pattern, then the sub-block requires five pixels to represent the sub-block. Assuming the 9:1 down-sampling pattern is used for all four sub-blocks, then the total number of pixels is four to represent the image and assuming the 9:4 down-sampling pattern is used for all four sub-blocks, then the total number of pixels is 16 to represent the image. Thus, compared to the 18 pixels that are used to represent the image using the N=1, 2, and 3 patterns, the 9:1 and 9:4 offer more compression.

In FIG. 4B, the N=2 down-sampling pattern is shown. This pattern uses 2 pixels for sampling and then drops 2 pixels. This pattern repeats horizontally as shown in FIG. 4B. Block 204 is thus represented by 18 pixels again.

FIG. 4C shows the N=3 down-sampling pattern. The N=3 down-sampling pattern samples 3 pixels and then drops 3 pixels in the horizontal direction. Block 204 is also represented by 18 pixels again. This pattern is not symmetric in that some sub-blocks are represented by three pixels and some sub-blocks are represented by six pixels. However, looking at the total number of pixels used, the 9:1 or 9:4 provide higher compression. Accordingly, the N=1, N=2, and N=3 down-sampling patterns use more pixels to represent block 210 than the 9:4 and 9:1 down-sampling patterns.

Down-sampler 102 may compare the block down-sampling patterns for the 6×6 block to determine which provides the highest quality. In the second phase, there is not a test on whether the pattern should be used against a threshold because the patterns on this level are the lowest level of compression possible in the process. That is, at least one block down-sampling pattern will be used if pixels in sub-blocks still need to be encoded. The test against the threshold in the first phase was used because there were lower compression block down-sampling patterns that could be used if the quality that resulted in the first phase was not adequate.

Figure 5A:
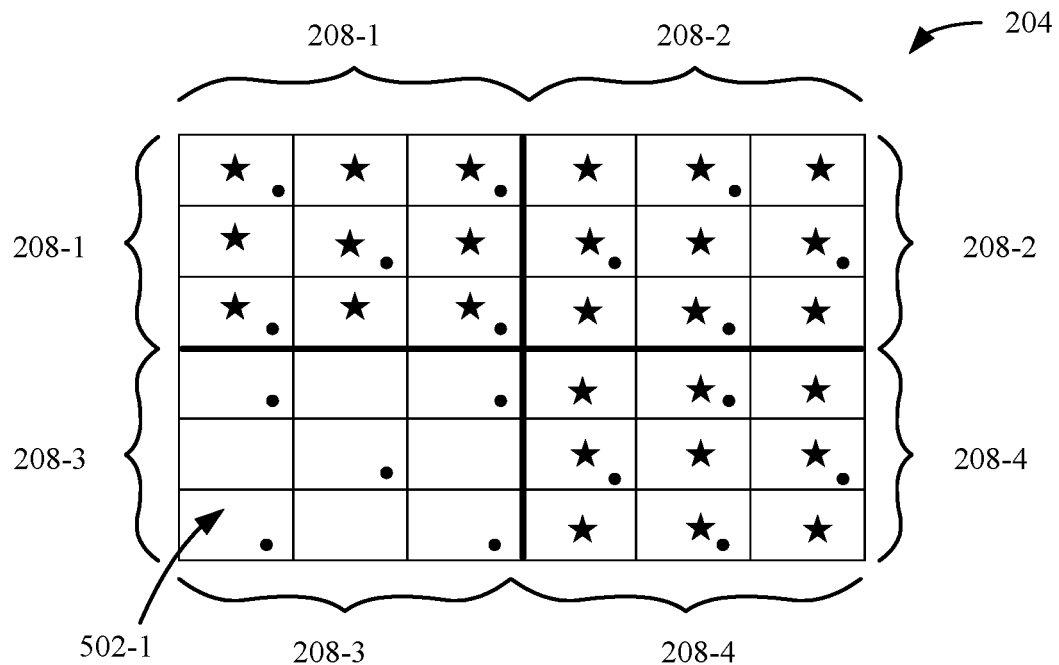
FIGS. 5A-5C depict examples of applying the three block down-sampling patterns according to on embodiment.
Figure 5B:
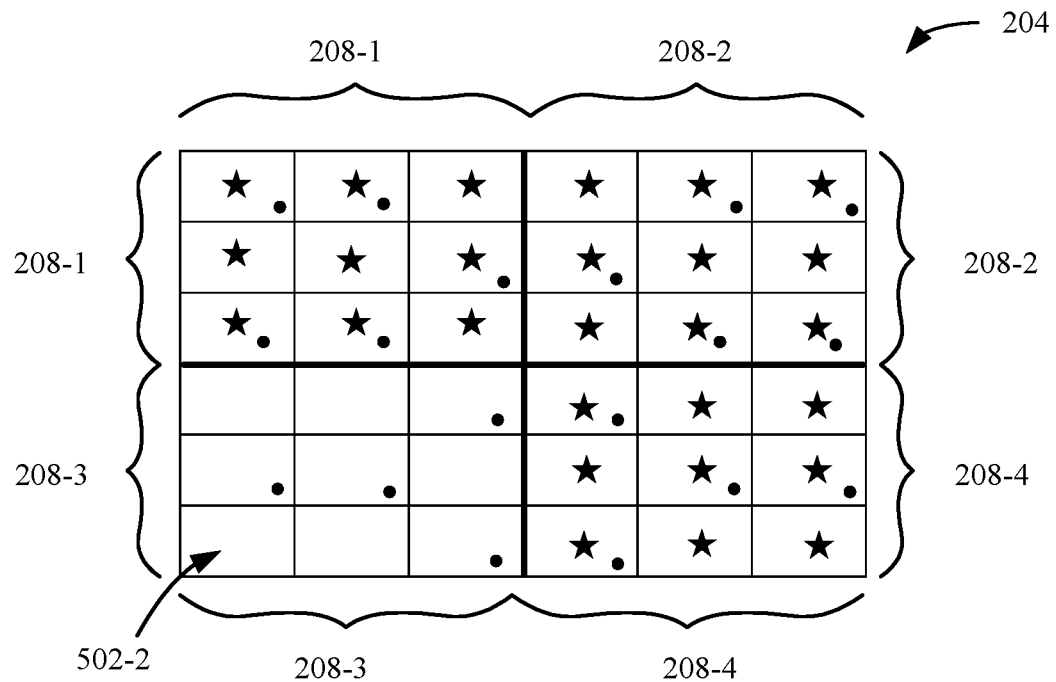
Figure 5C:
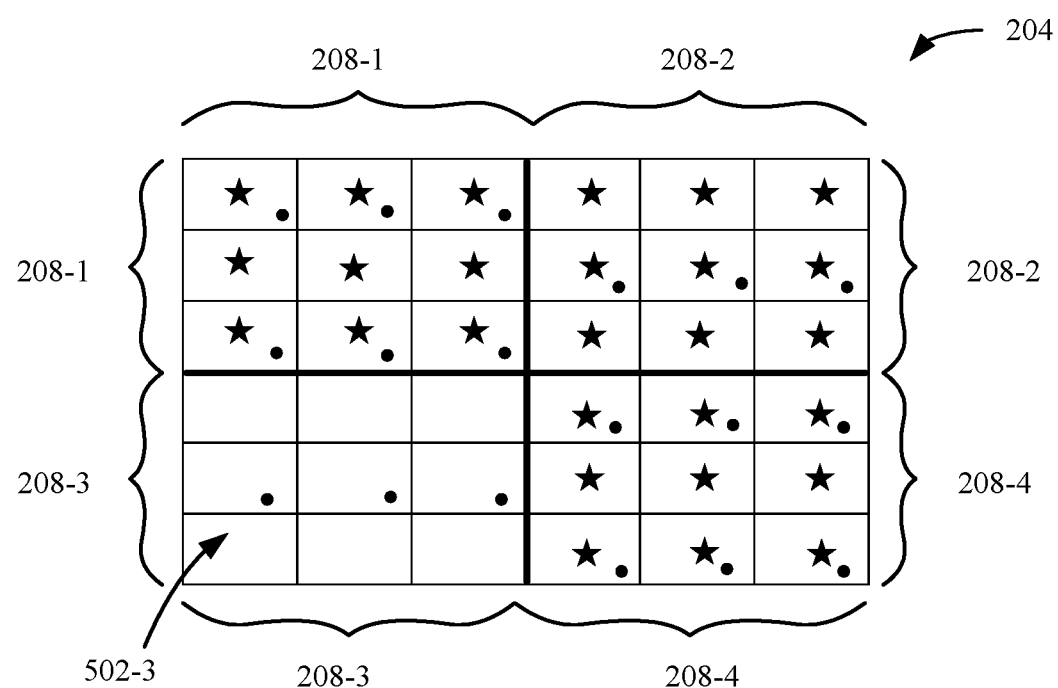

FIGS. 5A-5C depict examples of applying the three block down-sampling patterns according to various embodiments. FIG. 5A shows the N=1 block down-sampling pattern according to one embodiment. The dots in the blocks represent the pixels that are selected for the N=1 pattern. In this case, every other pixel is selected. However, the pixel units with the asterisks have already been encoded using other down-sampling patterns and are not selected for encoding again. Rather, only pixels in sub-blocks that did not have sub-block down-sampling patterns applied are selected as shown at 502-1 in sub-block 208-3. It is noted that although all pixel units in sub-blocks 208-1, 208-2, and 208-3 include asterisks, the encoded bitstream will only include those pixels that were selected by the down-sampling pattern.

The pixels corresponding to the dots shown at 502-1 in sub-block 208-3 would then be encoded by encoder 104. In this embodiment, four pixels are encoded. The pixels in the other sub-blocks 208-1, 208-2, and 208-4 that were selected using the sub-block down-sampling patterns have already been encoded and are used. Encoding system 101 can then decode the 6×6 block and measure the quality of the compression by comparing the original image to the decoded 6×6 image. The decoding of sub-block 208-3 may need to use pixels from sub-blocks 208-1, 208-2, and 208-3 to decode the pixels in sub-block 208-3. The pixels in sub-blocks 208-1, 208-2, and 208-3 could be recovered pixels or the original pixels. In this case, the pixels in sub-block 208-3 are recovered using the four pixels that were encoded. All the pixels for the 6×6 have then been recovered and can be compared to the original image to generate a quality measurement of the reconstruction.

Then, down-sampler 102 tests the other block down-sampling patterns. For example, FIG. 5B shows the N=2 block down-sampling pattern. The pixels corresponding to the dots shown at 502-2 in sub-block 208-3 would then be encoded by encoder 104. In this embodiment, four pixels are encoded, but in a different pattern from the N=1 pattern. Similar to the N=1 block down-sampling pattern, encoding system 101 can then decode sub-block 208-3 and measure the quality of the reconstruction by comparing the original image to the decoded 6×6 image.

FIG. 5C shows the N=3 block down-sampling pattern. The pixels corresponding to the dots shown at 502-3 in sub-block 208-3 would then be encoded by encoder 104. In this embodiment, three pixels are encoded. Similar to the N=1 block down-sampling pattern, encoding system 101 can then decode sub-block 208-3 and measure the quality of the reconstruction by comparing the original image to the decoded 6×6 image.

Then, the N=2 and N=3 block down-sampling patterns are rotated 90 degrees and tested. The N=1 pattern is the same when rotated 90 degrees so it is not used. Although these five patterns are used, it will be understood that other patterns may be used, such as N=4, 5, etc.

Once down-sampler 102 has tested all the block down-sampling patterns, down-sampler 102 selects the pattern that provided the highest quality reconstruction of the 6×6 block. Down-sampler 102 would generate side information indicating the pattern type that is used, such as N=1, N=2, N=3, etc. pattern is used. In one example, if the N=2 block down-sampling pattern is used, then down-sampler 102 generates side information that indicates sub-block 208-3 uses the N=2 block down-sampling pattern. Information indicating the sub-block down-sampling patterns may not be set in this case. In one example, a flag may be set for a block if the sub-block down-sampling patterns were used and not set if the sub-block down-sampling patterns were not used. Then, a first set of bits can be set to identify the sub-block down-sampling patterns that are used for each sub-block. If a sub-block does not have a sub-block down-sampling pattern applied, then a value, such as 00 or no bits, may be used to indicate a sub-block down-sampling pattern has not been used for that sub-block. Then, a second set of bits can be set to identify the block down-sampling patterns that are used for each sub-block. If all sub-blocks used a sub-block down-sampling pattern, then a value, such as 00 or no bits, may be used to indicate a block down-sampling pattern has not been used for that block. After this, bits for the pixels that were encoded may be included in the bitstream. Although this format is described, it will be understood other formats may be used.

The 6×6 block has already been encoded by encoder 104 in the down-sampling phases and output bits for the compressed pixels for the selected patterns can then be sent to decoding system 105. In another embodiment, encoder 104 may re-encode the original 6×6 block using the selected sub-block down-sampling patterns and/or block down-sampling patterns.

Method Flows

Figure 6:
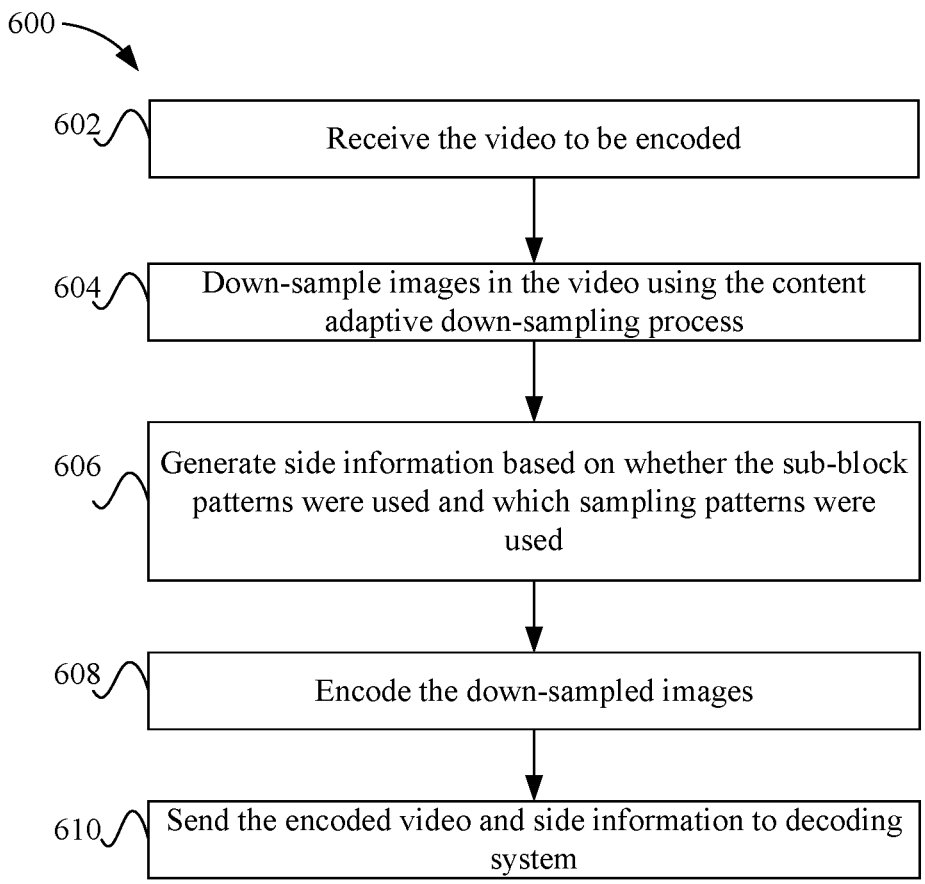
FIG. 6 depicts a simplified flowchart of a method for encoding a video according to one embodiment.

FIG. 6 depicts a simplified flowchart 600 of a method for encoding a video according to one embodiment. This is a general method that can be performed for the video. At 602, down-sampler 102 receives the video to be encoded. At 604, down-sampler 102 down-samples images in the video using the content adaptive down-sampling process described above. At 606, down-sampler 102 generates side information based on whether the sub-block patterns were used and which sampling patterns were used. At 608, encoder 104 encodes the down-sampled images. At 610, encoder 104 sends the encoded video and side information to decoding system 105.

Figure 7:
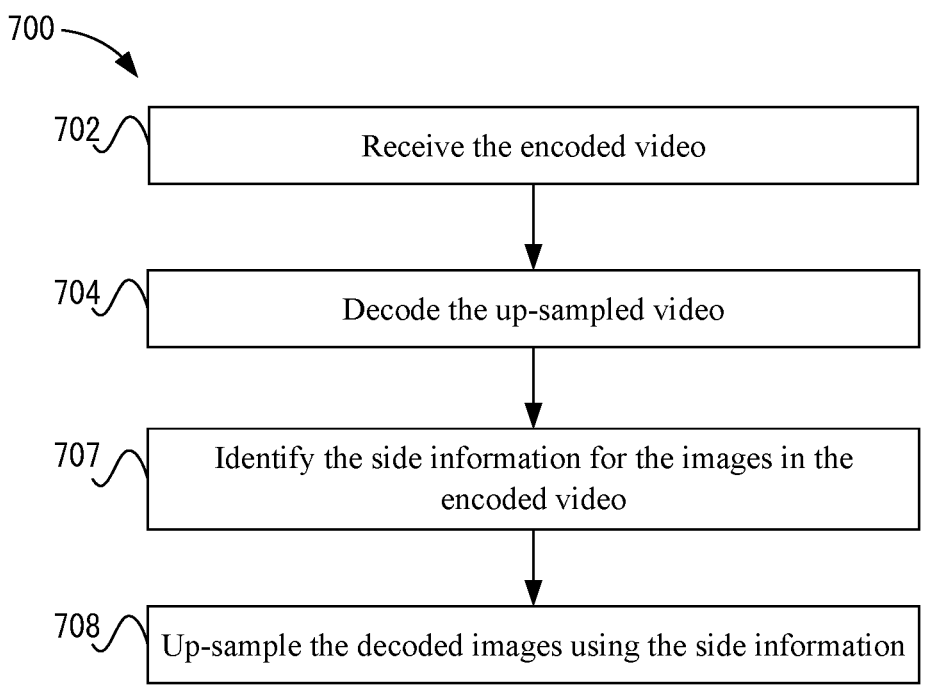
FIG. 7 depicts a simplified flowchart of a method for decoding of the video stream according to one embodiment.

FIG. 7 depicts a simplified flowchart 700 of a method for decoding of the video stream according to one embodiment. At 702, up-sampler 106 of decoding system 105 receives the encoded video. At 704, decoder 108 decodes the encoded video. At 706, up-sampler 106 identifies the side information for the images in the encoded video. The side information may be embedded in the encoded bitstream for the video or in a separate stream. At 708, up-sampler 106 then up-samples the decoded images using the side information. For example, the decoded images may be up-sampled based on whether sub-blocks were used and the pattern that was used in the blocks for the images. The up-sampling reproduces the pixels that was removed using interpolation of the pixels that were included in the encoded video stream.

Figure 8:
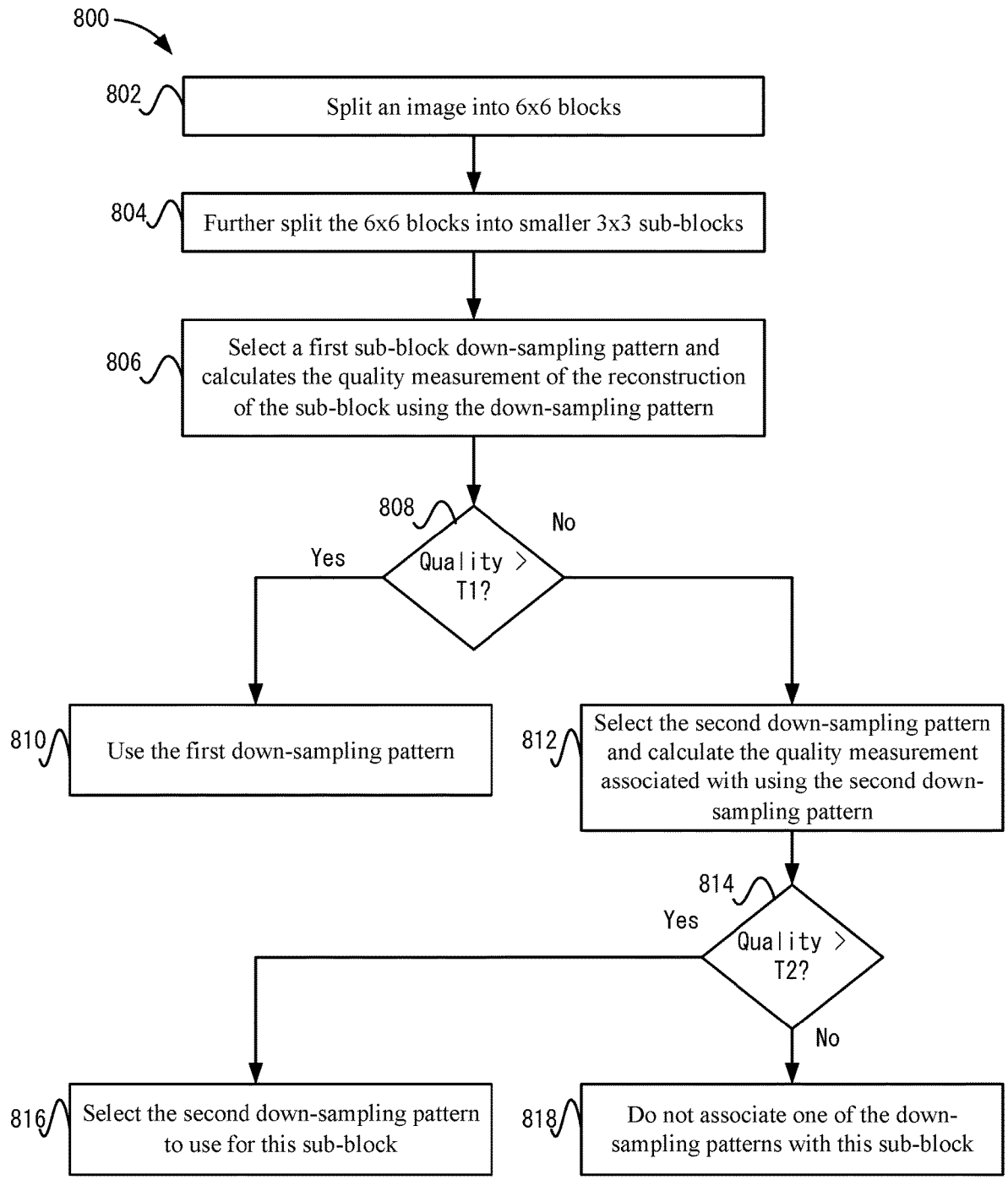
FIG. 8 depicts a simplified flowchart of a method for performing a first phase of the content adaptive down-sampling process according to one embodiment.

The specific content adaptive down-sampling processes will now be described. FIG. 8 depicts a simplified flowchart 800 of a method for performing a first phase of the content adaptive down-sampling process according to one embodiment. At 802, down-sampler 102 splits an image into 6×6 blocks. In this case, each 6×6 block has 6×6 pixel units in the image. Then, at 804, down-sampler 102 further splits the 6×6 blocks into smaller 3×3 sub-blocks the size of 3×3 pixel units.

At 806, down-sampler 102 selects a first sub-block down-sampling pattern, such as the 9:1 down-sampling pattern, and calculates the quality measurement of the reconstruction of the sub-block using the down-sampling pattern. At 808, down-sampler 102 determines if the quality is above a threshold T1. If the quality meets the threshold T1, then, at 810, down-sampler 102 uses the 9:1 down-sampling pattern. If not, at 812, down-sampler 102 selects the second down-sampling pattern, such as the 9:4 down-sampling pattern and calculates the quality measurement associated with using the 9:4 down-sampling pattern. At 814, down-sampler 102 compares the quality measurement for the 9:4 pattern against a threshold T2 to determine if the quality meets the threshold T2. If the quality meets the threshold T2, then at 816, down-sampler 102 selects the 9:4 down-sampling pattern to use for this sub-block. If the quality does not meet threshold T2 thus meaning that the quality for both down-sampling patterns do not meet the quality thresholds, then at 818 down-sampler 102 does not associate one of the down-sampling patterns with this sub-block.

Down-sampler 102 determines if another sub-block in the block needs to be analyzed. If so, the process reiterates to 806 to analyze another sub-block.

Figure 9:
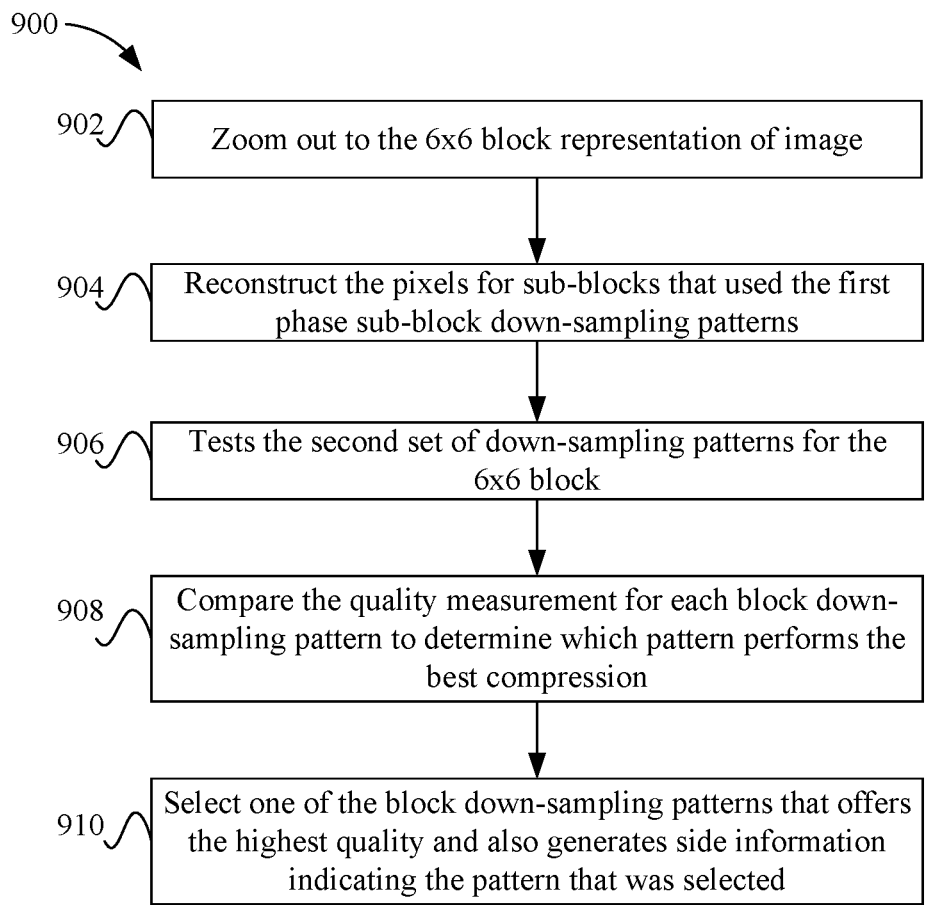
FIG. 9 depicts a simplified flowchart of a method for performing the second phase of the content adaptive down-sampling process according to one embodiment.

FIG. 9 depicts a simplified flowchart 900 of a method for performing the second phase of the content adaptive down-sampling process according to one embodiment. At 902, down-sampler 102 zooms out to the 6×6 block representation of image 202. At 904, down-sampler 102 reconstructs the pixels for sub-blocks that used the first phase sub-block down-sampling patterns. Then, at 906, down-sampler 102 tests the second set of down-sampling patterns for the 6×6 block. For example, N=1, 2, and 3, down-sampling patterns are tested. In the testing, down-sampler 102 records a quality measurement for each block down-sampling pattern.

At 908, down-sampler 102 compares the quality measurement for each block down-sampling pattern to determine which pattern performs the best reconstruction. At 910, down-sampler 102 selects one of the block down-sampling patterns that offers the highest quality and also generates side information indicating the pattern that was selected. The side information in this case may not need to indicate that the sub-block was used because this was not a sub-block pattern.

At 912, encoder 104 sends the encoded bitstream to decoding system 105 with the side information that indicates the pattern used and whether the sub-block down-sampling pattern was used. As discussed above, the pixels that were encoded using the sub-block down-sampling patterns are not affected by the block down-sampling patterns. Only pixels from sub-blocks that were not part of the sub-block down-sampling patterns are encoded using the block down-sampling patterns.

System Examples

Particular embodiments may be used in different systems. For example, particular embodiments may be used in a streaming media service that streams media from a server to a client. In another embodiment, particular embodiments may be used in an embedded computer system that may encode video from one internal component to another internal component.

Figure 10:
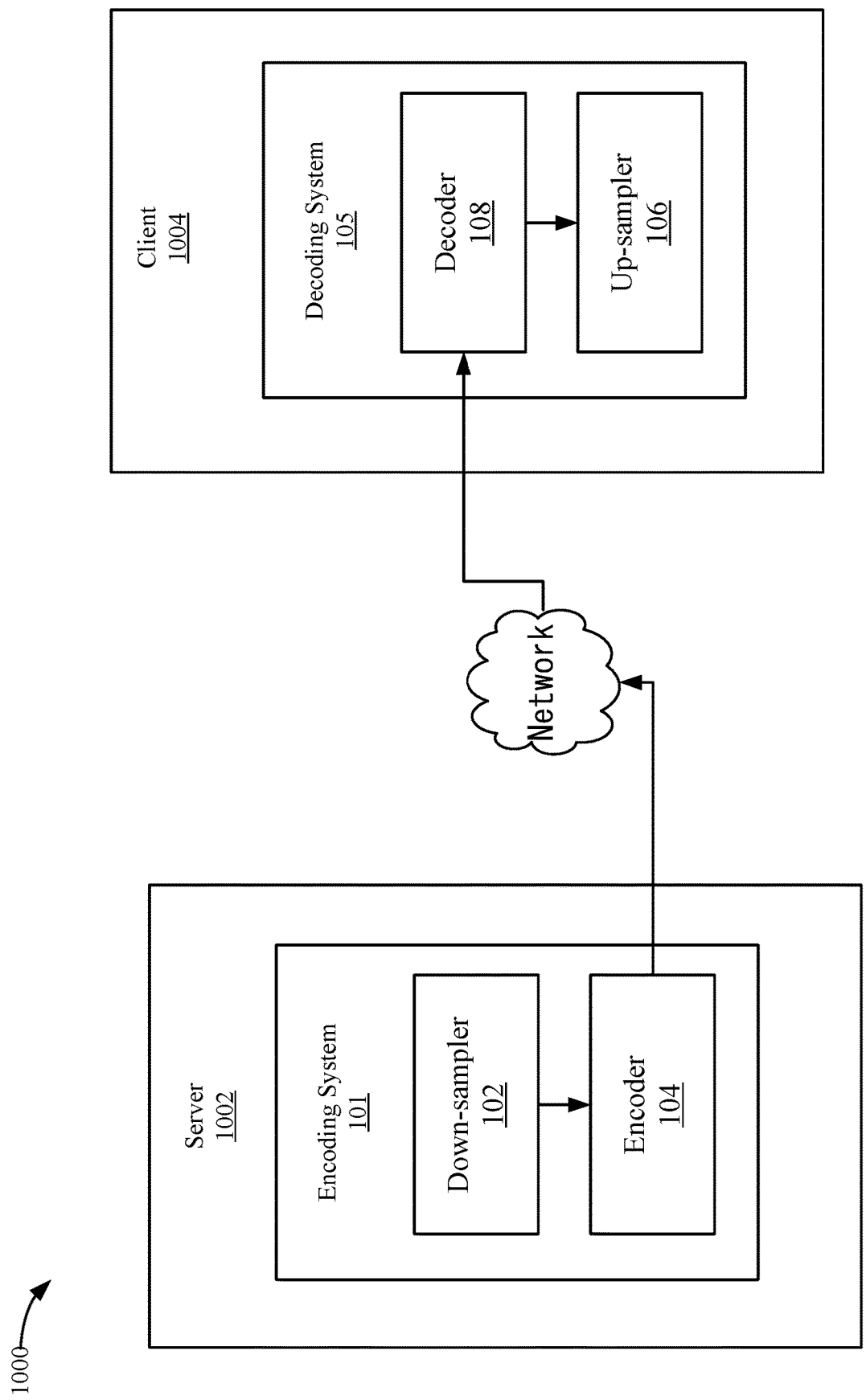
FIG. 10 depicts an example of a system for streaming video using the content adaptive down-sampling process according to one embodiment.

FIG. 10 depicts an example of a system 1000 for streaming video using the content adaptive down-sampling process according to one embodiment. A server 1002 may stream video to a client 1004. Server 1002 includes encoding system 101 and client 1004 includes decoding system 105. Server 1002 may receive video and encode the video using the content adaptive down-sampling process. Encoding system 1001 may then send the encoded video and side information to client 1004. Decoding system 1005 can then decode the encoded video and using the side information provide the encoded video to a media player 1006.

Figure 11:
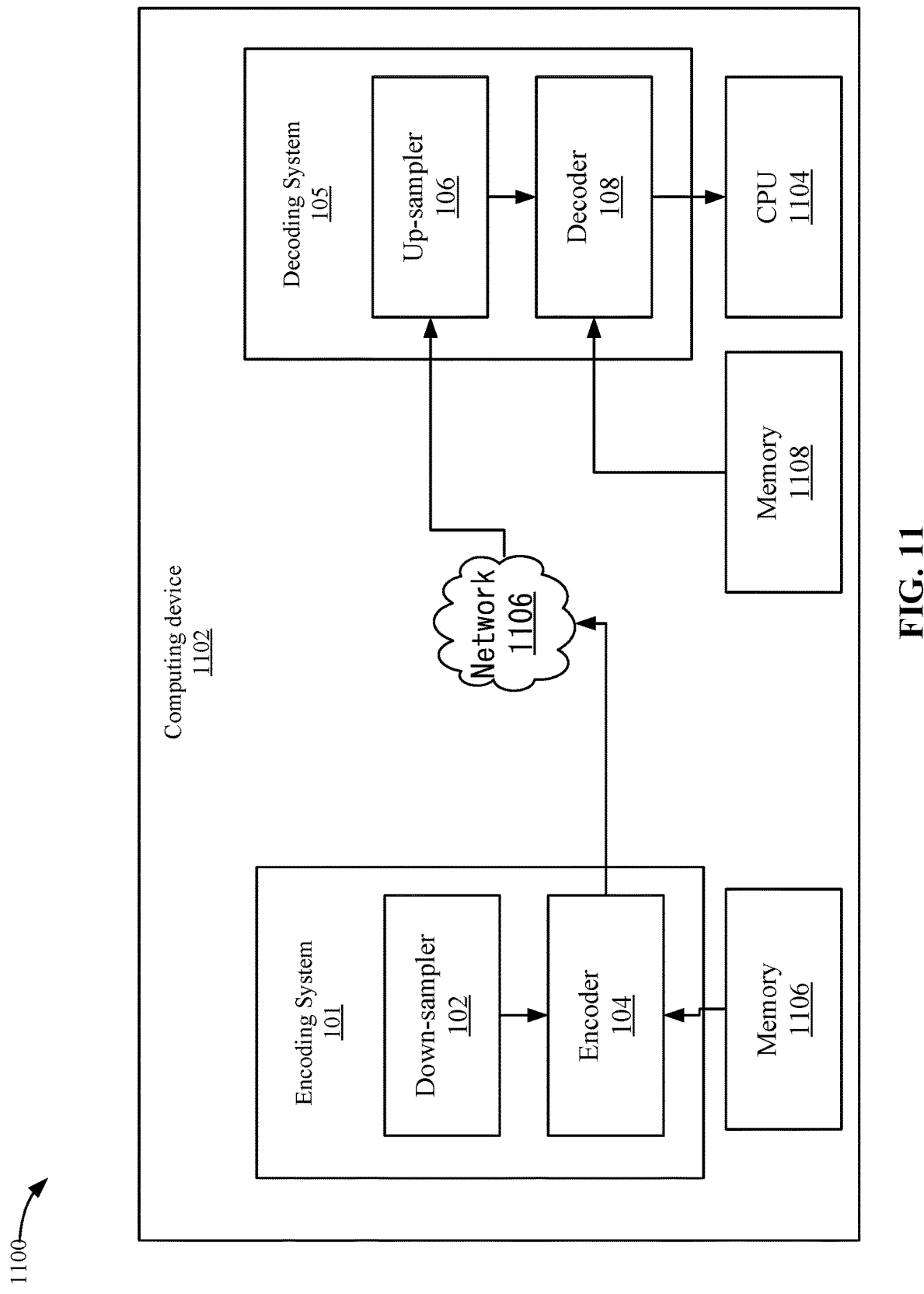
FIG. 11 depicts an embedded computer system that uses the content adaptive down-sampling process according to one embodiment.

FIG. 11 depicts an embedded computer system 1100 that uses the content adaptive down-sampling process according to one embodiment. A computing device 1102 includes encoding system 101, decoding system 105, and a CPU 1104. Encoder 101 may encode the video and provided the encoded video to decoding system 105 with the side information. Encoder 104 may receive a down-sampled image from memory 1106 for use in the encoding process. The images in memory 1106 were down-sampled using the content adaptive down-sampling process. Encoding system 101 may send the encoded video via an internal network 1106, such as a BUS, to decoding system 105.

Decoding system 105 then decodes the encoded video stream using the side information. Decoder 108 may also receive an up-sampled image from memory 1108 for use in the decoding process. The images in memory 1108 were up-sampled using the content adaptive down-sampling process. The video can then be provided to a central processing unit (CPU) 1104.

Conclusion

Particular embodiments described herein provide low complexity video processing in that the encoding and decoding can be performed at high speed and not hinder the workflow of a video processor. Also, much higher reconstruction quality is provided that does not adversely affect the precision of inter-frame video processing. Additionally, particular embodiments provide random access to a code stream to support the inter-frame block matching operation encountered in many video processing tasks. Further, preference is given to decoding in that there are many more reading operations than running operations between a processor and memory. For example, the frequent access to reference frames when performing motion estimation may need to be accounted for.

Adjacent pixels are very likely to have similar edge properties, and thus down-sampled by the same patterns. This correlation can be exploited by entropy coding like adaptive arithmetic coding. Run-length coding or Huffman coding may work without increasing the bitrate that much while lowering the computational complexity. Also, the side information sent is very small compared to the encoded bitstream because only a small number of bits are needed to indicate whether sub-block encoding is used and the pattern that is used.

System

Figure 12:
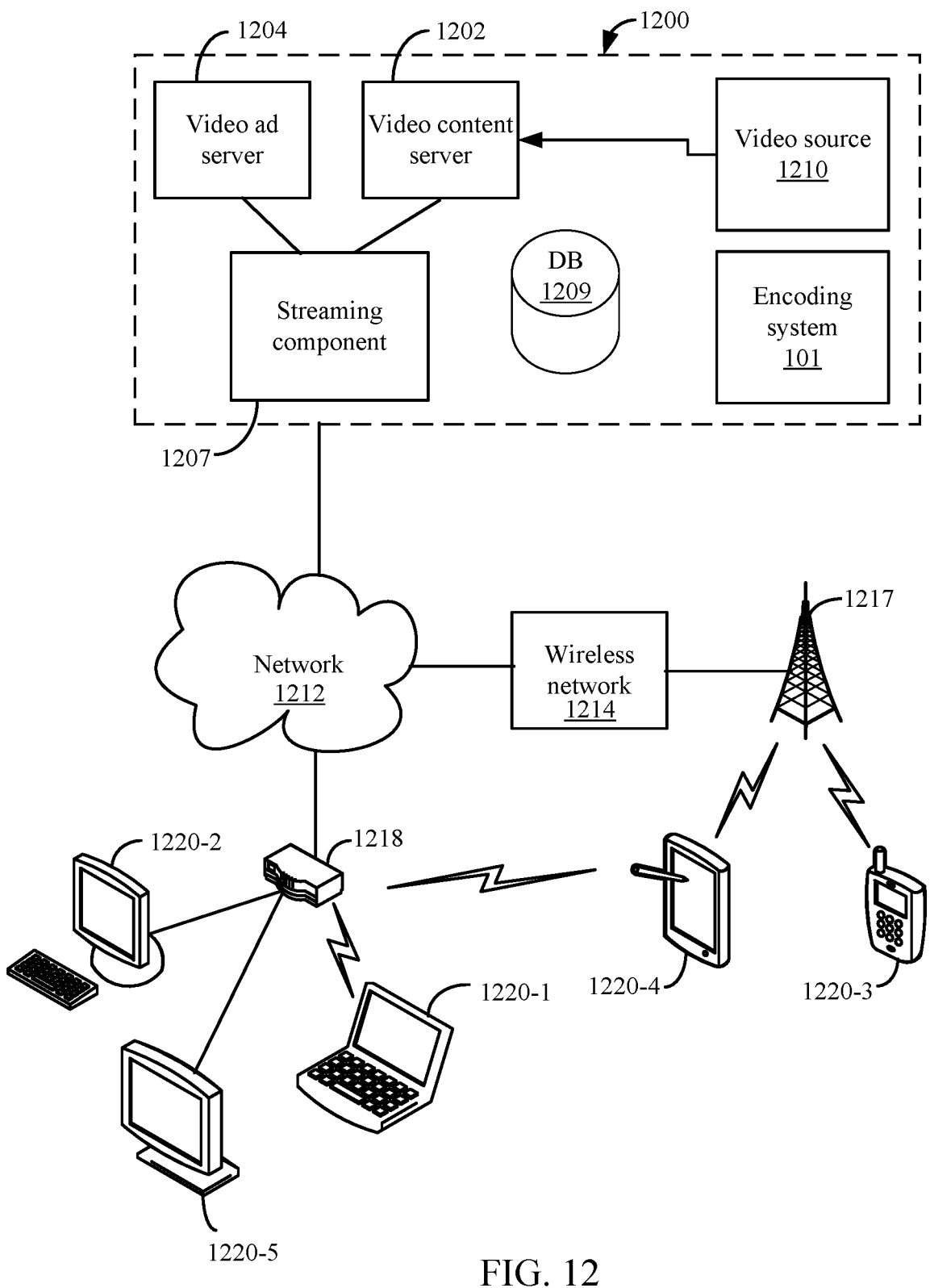
FIG. 12 depicts a video streaming system in communication with multiple client devices via one or more communication networks according to one embodiment.

Features and aspects as disclosed herein may be implemented in conjunction with a video streaming system 1200 in communication with multiple client devices via one or more communication networks as shown in FIG. 12. Aspects of the video streaming system 1200 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 1200, video data may be obtained from one or more sources for example, from a video source 1210, for use as input to a video content server 1202. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 1200 may include one or more computer servers or modules 1202, 1204, and/or 1207 distributed over one or more computers. Each server 1202, 1204, 1207 may include, or may be operatively coupled to, one or more data stores 1209, for example databases, indexes, files, or other data structures. A video content server 1202 may access a data store (not shown) of various video segments. The video content server 1202 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1204 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 1200, a public service message, or some other information. The video advertising server 1204 may serve the video advertising segments as directed by a user interface controller (not shown).

The video streaming system 1200 also may include encoding system 101.

The video streaming system 1200 may further include an integration and streaming component 1207 that integrates video content and video advertising into a streaming video segment. For example, streaming component 1207 may be a content server or streaming media server. A controller (not shown) may determine the selection or configuration of advertising in the streaming video based on any suitable algorithm or process. The video streaming system 1200 may include other modules or units not depicted in FIG. 12, for example administrative servers, commerce servers, network infrastructure, advertising selection engines, and so forth.

The video streaming system 1200 may connect to a data communication network 1212. A data communication network 1212 may comprise a local area network (LAN), a wide area network (WAN), for example, the Internet, a telephone network, a wireless cellular telecommunications network (WCS) 1214, or some combination of these or similar networks.

One or more client devices 1220 may be in communication with the video streaming system 1200, via the data communication network 1212 and/or other network 1214. Such client devices may include, for example, one or more laptop computers 1220-1, desktop computers 1220-2, "smart" mobile phones 1220-3, tablet devices 1220-4, network-enabled televisions 1220-5, or combinations thereof, via a router 1218 for a LAN, via a base station 1217 for a wireless telephony network 1214, or via some other connection. In operation, such client devices 1220 may send and receive data or instructions to the system 1200, in response to user input received from user input devices or other input. In response, the system 1200 may serve video segments and metadata from the data store 1209 responsive to selection of media programs to the client devices 1220. Client devices 1220 may output the video content from the streaming video segment in a media player using a display screen, projector, or other video output device, and receive user input for interacting with the video content.

Distribution of audio-video data may be implemented from streaming component 1207 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1207 may communicate with client device 1220 using control messages and data messages to adjust to changing network conditions as the video is played. These control messages can include commands for enabling control functions such as fast forward, fast reverse, pausing, or seeking to a particular part of the file at the client.

Since streaming component 1207 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) the video file is not stored in the viewer's computer, but discarded by the media player, thus allowing more control over the content.

Streaming component 1207 may use TCP-based protocols, such as HTTP and Real Time Messaging Protocol (RTMP). Streaming component 1207 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 13:
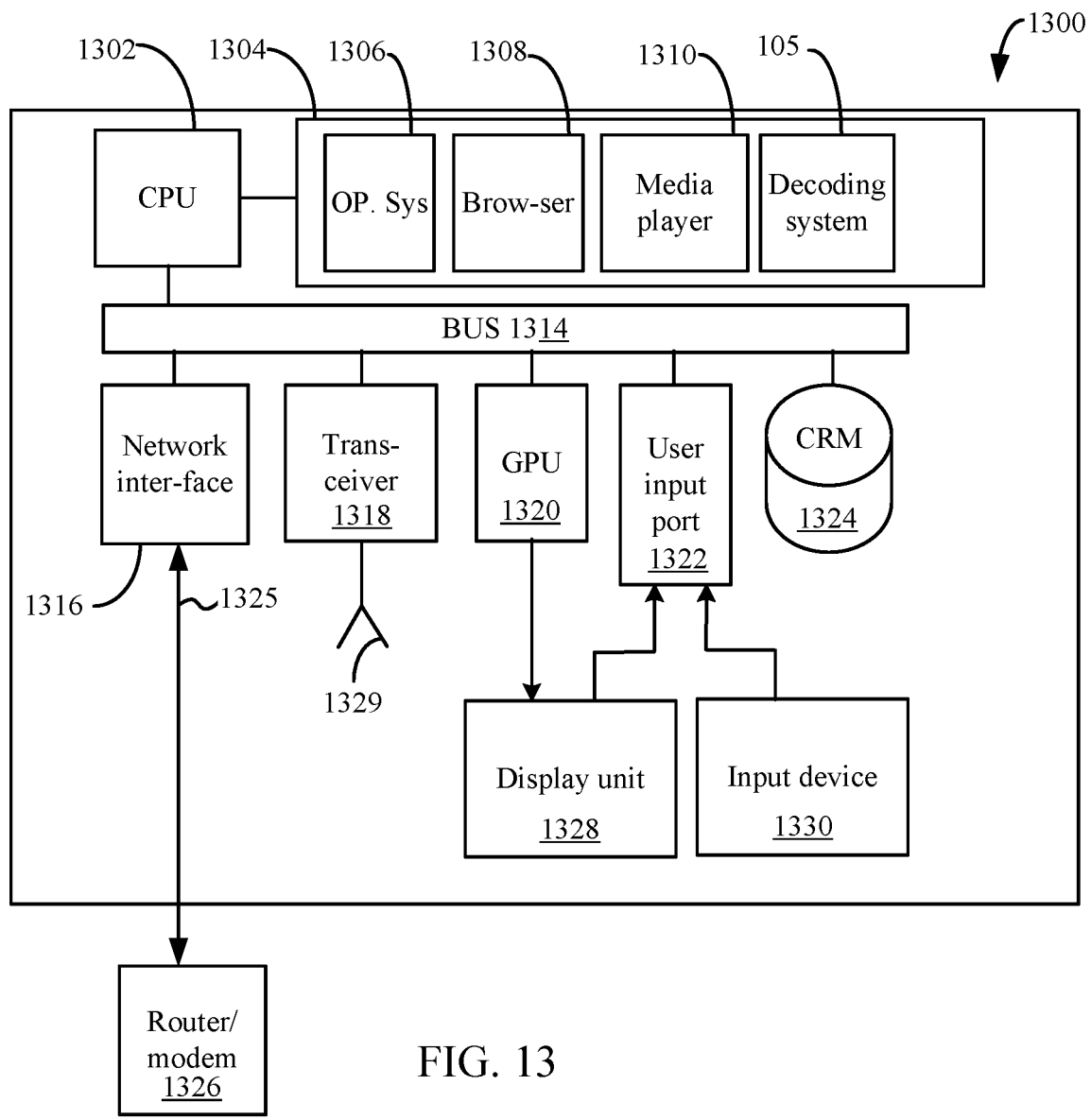
FIG. 13 depicts a diagrammatic view of an apparatus for viewing video content and advertisements.

Referring to FIG. 13, a diagrammatic view of an apparatus 1300 for viewing video content and advertisements is illustrated. In selected embodiments, the apparatus 1300 may include a processor (CPU) 1302 operatively coupled to a processor memory 1304, which holds binary-coded functional modules for execution by the processor 1302. Such functional modules may include an operating system 1306 for handling system functions such as input/output and memory access, a browser 1308 to display web pages, and media player 1310 for playing video. The modules may further include decoding system 105. The memory 1304 may hold additional modules not shown in FIG. 13, for example modules for performing other operations described elsewhere herein.

A bus 1314 or other communication component may support communication of information within the apparatus 1300. The processor 1302 may be a specialized or dedicated microprocessor configured to perform particular tasks in accordance with the features and aspects disclosed herein by executing machine-readable software code defining the particular tasks. Processor memory 1304 (e.g., random access memory (RAM) or other dynamic storage device) may be connected to the bus 1314 or directly to the processor 1302, and store information and instructions to be executed by a processor 1302. The memory 1304 may also store temporary variables or other intermediate information during execution of such instructions.

A computer-readable medium (CRM) in a storage device 1324 may be connected to the bus 1314 and store static information and instructions for the processor 1302; for example, the storage device (CRM) 1324 may store the modules 1306, 1308, and 1310 when the apparatus 1300 is powered off, from which the modules may be loaded into the processor memory 1304 when the apparatus 1300 is powered up. The storage device 1324 may include a non-transitory computer-readable storage medium holding information, instructions, or some combination thereof, for example instructions that when executed by the processor 1302, cause the apparatus 1300 to be configured to perform one or more operations of a method as described herein.

A communication interface 1316 may also be connected to the bus 1314. The communication interface 1316 may provide or support two-way data communication between the apparatus 1300 and one or more external devices, e.g., the streaming system 1200, optionally via a router/modem 1326 and a wired or wireless connection. In the alternative, or in addition, the apparatus 1300 may include a transceiver 1318 connected to an antenna 1329, through which the apparatus 1300 may communicate wirelessly with a base station for a wireless communication system or with the router/modem 1326. In the alternative, the apparatus 1300 may communicate with a video streaming system 1200 via a local area network, virtual private network, or other network. In another alternative, the apparatus 1300 may be incorporated as a module or component of the system 1200 and communicate with other components via the bus 1314 or by some other modality.

The apparatus 1300 may be connected (e.g., via the bus 1314 and graphics processing unit 1320) to a display unit 1328. A display 1328 may include any suitable configuration for displaying information to an operator of the apparatus 1300. For example, a display 1328 may include or utilize a liquid crystal display (LCD), touchscreen LCD (e.g., capacitive display), light emitting diode (LED) display, projector, or other display device to present information to a user of the apparatus 1300 in a visual display.

One or more input devices 1330 (e.g., an alphanumeric keyboard, microphone, keypad, remote controller, game controller, camera or camera array) may be connected to the bus 1314 via a user input port 1322 to communicate information and commands to the apparatus 1300. In selected embodiments, an input device 1330 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1328, for example using a touch sensitive screen. A cursor control device may communicate direction information and command selections to the processor 1302 and control cursor movement on the display 1328. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
receiving, by a computing device, an image from a video;
splitting, by the computing device, the image into a first set of first blocks of a first size;
splitting, by the computing device, first blocks in the first set of first blocks into a second set of second blocks of a second size;
testing, by the computing device, a first set of down-sampling patterns that reduce a first number of pixels that are encoded for the second set of second blocks in a first block in the set of first blocks to determine if a quality of reconstruction of the down-sampled second blocks meets a threshold associated with the respective first set of down sampling patterns, wherein second blocks satisfying the threshold are down-sampled using the first set of down-sampling patterns;
when one or more second blocks do not satisfy the threshold, testing, by the computing device, a second set of down-sampling patterns that reduce a second number of pixels that are encoded for the one or more second blocks to select one of the second set of down sampling patterns to use to down-sample the one or more second blocks that did not satisfy the threshold; and
sending, by the computing device, an encoding of the first block for the image based on the first block being down-sampled using at least one of the first set of down sampling patterns and at least one of the second set of down-sampling patterns.

2. The method of claim 1, wherein testing the first set of down-sampling patterns comprises:
testing a first down-sampling pattern in the first set of down-sampling patterns for a second block in the set of second blocks;
determining if the quality of reconstruction for the second block using the first down-sampling pattern meets a first threshold; and
if the first threshold is met, using the first down-sampled pattern for the second block.

3. The method of claim 2, wherein testing the first down sampling pattern comprises:
selecting a first subset of pixels in the second block according the first down-sampling pattern; and
encoding the first subset of pixels to represent the second block.

4. The method of claim 3, wherein testing the first down sampling pattern comprises:
recovering a second subset of pixels in the second block that were not encoded using the first subset of pixels; and
decoding the first subset of pixels and the second subset of pixels to represent the second block.

5. The method of claim 4, wherein testing the first down sampling pattern comprises:
measuring the quality of reconstruction by comparing the decoded first subset of pixels and the second subset of pixels to a portion of the image received in the video.

6. The method of claim 2, wherein when the first threshold is not met, performing:
testing a second down-sampling pattern in the first set of down-sampling patterns for the second block;
determining if the quality of reconstruction for the second block using the second down-sampling pattern meets a second threshold; and
if the second threshold is met, using the second down-sampled pattern for the second block.

7. The method of claim 1, wherein testing the second set of down-sampling patterns comprises:
comparing the second set of down-sampling patterns to select one of the second set of down-sampling patterns; and
using one of the second set of down-sampled patterns for the one or more second blocks that were not down-sampled using the first set of down-sampling patterns.

8. The method of claim 7, wherein testing the second set of down-sampling patterns comprises:
decoding a first subset of pixels in the one or more second blocks that were encoded using the first set of down-sampling patterns; and
recovering a second subset of pixels that were not encoded using the first subset of pixels.

9. The method of claim 8, further comprising:
applying the second set of down-sampling patterns to the pixels in the one or more second blocks that were not down-sampled using the first set of down-sampling patterns; and
applying one of the second set of down-sampled patterns to select a first subset of pixels for the one or more second blocks that were not down-sampled using the first set of down-sampling patterns.

10. The method of claim 9, further comprising:
decoding a third subset of pixels in the one or more second blocks that were not down-sampled using the first set of down-sampling patterns; and
recovering a fourth subset of pixels in the one or more second blocks that were not down-sampled using the third subset of pixels.

11. The method of claim 10, further comprising:
measuring the quality of reconstruction by comparing the first subset of pixels, the second subset of pixels, the third subset of pixels, and the fourth subset of pixels to a portion of the image received in the video.

12. A method comprising:
receiving, by a computing device, an image from a video;
splitting, by the computing device, the image into a first set of first blocks of a first size;
splitting, by the computing device, first blocks in the first set of first blocks into a second set of second blocks of a second size;
testing, by the computing device, a first set of down-sampling patterns for the second set of second blocks in a first block in the set of first blocks to determine if a quality of reconstruction of the down-sampled second blocks meets a threshold associated with the respective first set of down sampling patterns, wherein second blocks satisfying the threshold are down-sampled using the first set of down-sampling patterns;
testing, by the computing device, a second set of down-sampling patterns for the first block using a second set of down-sampling patterns to select one of the second set of down sampling patterns to use to down-sample second blocks that did not satisfy the threshold; and
sending, by the computing device, an encoding of the first block for the image based on the first block being down-sampled using at least one of the first set of down sampling patterns and at least one of the second set of down-sampling patterns, wherein the first block is encoded during the testing of the first set of down-sampling patterns and the testing of the second set of down-sampling patterns.

13. The method of claim 1, wherein:
the first set of down-sampling patterns have a compression greater than one half a sampling of pixels; and
the second set of down-sampling patterns have a compression less than the first set of down-sampling patterns.

14. The method of claim 1, wherein the first set of down-sampling patterns have a 9:4 compression ratio and a 9:1 compression ratio.

15. The method of claim 1, wherein the first set of down-sampling patterns includes a pattern that encodes pixels in four corners of the set of second blocks.

16. The method of claim 1, wherein the first set of down-sampling patterns includes a pattern that encodes a single pixel in a center of the set of second blocks.

17. A non-transitory computer-readable storage medium containing instructions, that when executed, control a computer system to be configured for:
receiving an image from a video;
splitting the image into a first set of first blocks of a first size;
splitting first blocks in the first set of first blocks into a second set of second blocks of a second size;
testing a first set of down-sampling patterns that reduce a first number of pixels that are encoded for the second set of second blocks in a first block in the set of first blocks to determine if a quality of reconstruction of the down-sampled second blocks meets a threshold associated with the respective first set of down sampling patterns, wherein second blocks satisfying the threshold are down-sampled using the first set of down-sampling patterns;
when one or more second blocks do not satisfy the threshold, testing a second set of down-sampling patterns that reduce a second number of pixels that are encoded for the one or more second blocks to select one of the second set of down sampling patterns to use to down-sample the one or more second blocks that did not satisfy the threshold; and
sending an encoding of the first block for the image based on the first block being down-sampled using at least one of the first set of down sampling patterns and at least one of the second set of down-sampling patterns.

18. A method comprising:
receiving, by a computing device, an image from a video;
splitting, by the computing device, the image into a first set of first blocks of a first size;
splitting, by the computing device, first blocks in the first set of first blocks into a second set of second blocks of a second size;
encoding, by the computing device, a first portion of second blocks for a first block using a first set of down-sampling patterns when a quality of reconstruction of down-sampled second blocks meets a threshold for the respective first set of down sampling patterns;
when the quality of reconstruction for a second portion of second blocks does not meet the threshold for the respective first set of down sampling patterns, encoding, by the computing device, the second portion of second blocks using a second set of down-sampling patterns for the first block, wherein the second set of down sampling patters are applied to the first size of the first block; and
sending, by the computing device, an encoding of the first block based on the first portion being encoded by at least one of the first set of down sampling patterns and the second portion being encoded by at least one of the second set of down-sampling patterns.

19. The method of claim 18, wherein the first set of down-sampling patterns are applied to the second size of the second blocks.

20. The method of claim 18, wherein the second set of down-sampling patterns are applied to the first size of the first blocks and do not encode any of the first portion of second blocks.

* * * * *